United States Patent
Dyckrup et al.

(10) Patent No.: US 9,797,437 B2
(45) Date of Patent: Oct. 24, 2017

(54) CONNECTING DEVICE, FLAP SYSTEM AND AIRCRAFT HAVING SUCH A CONNECTING DEVICE

(75) Inventors: Werner Dyckrup, Visbek (DE); Hauke Harding, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 696 days.

(21) Appl. No.: 13/558,973

(22) Filed: Jul. 26, 2012

(65) Prior Publication Data
US 2013/0020443 A1 Jan. 24, 2013

Related U.S. Application Data

(63) Continuation of application No. PCT/EP2011/000442, filed on Feb. 1, 2011.

(60) Provisional application No. 61/300,091, filed on Feb. 1, 2010.

(30) Foreign Application Priority Data

Feb. 1, 2010 (DE) .................. 10 2010 006 447

(51) Int. Cl.
*B64C 9/02* (2006.01)
*F16C 11/06* (2006.01)

(52) U.S. Cl.
CPC ...... *F16C 11/0604* (2013.01); *F16C 2326/43* (2013.01); *Y10T 403/32631* (2015.01)

(58) Field of Classification Search
CPC .............. F16C 11/0604; F16C 2326/43; F16C 11/0685; F16C 11/069; F16C 11/0695; F16C 11/0614; F16C 11/04; F16C 35/047; Y10T 403/32631; F16L 3/16; B64C 9/02

USPC ................ 244/213, 99.2, 99.3, 215; 901/16; 403/122, 128–131
See application file for complete search history.

(56) References Cited

U.S. PATENT DOCUMENTS

| | | | |
|---|---|---|---|
| 4,213,587 A | 7/1980 | Roeseler et al. | |
| 5,280,941 A * | 1/1994 | Guhlin | B60D 1/60 280/507 |
| 5,447,282 A * | 9/1995 | Durand | 244/54 |
| 6,530,544 B2 | 3/2003 | Milliere | |
| 7,708,488 B2 * | 5/2010 | Kunze et al. | 403/149 |
| 8,490,927 B2 * | 7/2013 | Parker | 244/215 |
| 2009/0154988 A1 | 6/2009 | Kunze et al. | |

(Continued)

FOREIGN PATENT DOCUMENTS

| | | |
|---|---|---|
| DE | 2944114 A1 | 6/1980 |
| DE | 195 19 867 A1 | 12/1996 |

(Continued)

OTHER PUBLICATIONS

International Search Report for Application Serial No. WO 2011/092036 A1 dated Jun. 22, 2011.

(Continued)

*Primary Examiner* — Tien Dinh
*Assistant Examiner* — Vicente Rodriguez
(74) *Attorney, Agent, or Firm* — Jenkins, Wilson, Taylor & Hunt, P.A.

(57) ABSTRACT

The invention pertains to a connecting device for connecting a first structural component and a second structural component that can be moved relative to the first structural component in an articulated fashion such that three rotatory degrees of freedom are provided.

15 Claims, 9 Drawing Sheets

(56) References Cited

U.S. PATENT DOCUMENTS

2009/0308681 A1* 12/2009 Brunneke .................... 180/400
2010/0054641 A1*  3/2010 Snow ........................... 384/125

FOREIGN PATENT DOCUMENTS

| | | |
|---|---|---|
| DE | 60100589 T2 | 6/2004 |
| DE | 10 2004 055 961 | 5/2006 |
| EP | 1 336 722 | 8/2003 |
| WO | WO 2006/110049 A2 | 10/2006 |
| WO | WO 2009150445 A1 * | 12/2009 |

OTHER PUBLICATIONS

IPRP and Written Opinion for International Application No. PCT/EP2011/000442 dated Aug. 7, 2012.

* cited by examiner

CONNECTING DEVICE, FLAP SYSTEM AND AIRCRAFT HAVING SUCH A CONNECTING DEVICE

CROSS-REFERENCE TO RELATED APPLICATIONS

This application is a continuation of PCT/EP2011/000442 filed Feb. 1, 2011 which claims the benefit of and priority to U.S. Provisional Application No. 61/300,091, filed Feb. 1, 2010 and German Patent Application No. 10 2010 006 447.5, filed Feb. 1, 2010 the entire disclosures of which are herein incorporated by reference.

TECHNICAL FIELD

The invention relates to a connecting device for connecting a first structural component and a second structural component that can be moved relative to the first structural component in an articulated fashion such that three rotational degrees of freedom are provided. Further, invention relates to a flap system and aircraft having such a connecting device.

BACKGROUND

For example, regulating flaps of an aircraft are connected to a main wing by means of an actuator, wherein the actuator serves for moving the regulating flap relative to the main wing. In known systems, a connection with a pivot bearing is normally used as connecting device between such an actuator on the one hand and a regulating flap on the other hand. However, their rotational degrees of freedom are very limited, particularly to permissible pivoting angles of no more than 16°. Some special designs make it possible to achieve slightly larger pivoting angles, but only with a high constructive effort. This constructive effort not only increases the required space, but also the weight of the connecting device. Bolt bearings may also be used as connecting devices. In this case, it is common practice to provide bolts that extend through bearing bores in both structural components, i.e., in the actuator as well as in the regulating flap. These bolts make it possible to realize a rotative movement of the two structural components relative to one another about the rotational axis of the bolt. However, the disadvantage of such an arrangement can be seen in that only a single degree of freedom of the relative movement can be realized.

It is the objective of the present invention to eliminate the disadvantages of known connecting devices and, in particular, to provide a connecting device that makes it possible to realize three rotative degrees of freedom, as well as the corresponding failure safety.

The aforementioned objective is attained with the features of the independents claims. Further embodiments are defined in the subclaims referred thereto.

SUMMARY

With a connecting device according to the invention, loads are transmitted with allowing three rotational degrees of freedom and with a high reliability. If the connecting device is used for connecting structural components of a high-lift system of an aircraft, this concerns, for example, the transmission of the aerodynamic loads created by the air acting upon the regulating flaps. The load transmission according to the invention is in particular fail-safe in many applications, primarily in the field of aviation. This means that the failure of a supporting part due to a defect is avoided.

According to the invention, a connecting device is provided for connecting a first structural component and a second structural component that can be moved relative to the first structural component in an articulated manner such that three rotational degrees of freedom are provided, the connecting device featuring:

a joint head joint part with a joint head for being accommodated by a receiver of the first structural component and a joint head support with a joint head endpiece for the mounting thereof on the second structural component such that a first load path between the two structural components is formed due to the accommodation of the joint head in the receiver, with the joint head joint part featuring a cavity with an inner cavity surface, wherein the cavity extends through the joint head and the joint head support, a securing arm with a securing arm endpiece for the mounting thereof on the second structural component, with said securing arm extending into the cavity of the joint head joint part, wherein the securing arm respectively is sectionally extending along an inner cavity surface of the joint head support such that the securing arm makes available a second load path between the first and the second structural component in case of a mechanical defect that involves a weakening of the joint head joint part and an accommodation of a section of the securing arm by the inner cavity surface of the joint head support.

An inventive connecting device for connecting a first structural component and a second structural component that can be moved relative to the first structural component such that three rotatory degrees of freedom are provided. In particular, it features a joint head joint part with a joint head that is accommodated in a receiver like a bearing shell or a retainer being accommodated by or fixed to the first structural component and a joint head support with a joint part endpiece or joint head endpiece for the mounting thereof on the second structural component such that a first load path between the two structural components is formed due to the accommodation of the joint head in the receiver. In this case, the joint head joint part features a cavity that extends through the joint head and the joint head support. In addition, a securing arm with a securing arm endpiece for the mounting thereof on the second structural component is provided and extends in the cavity of the joint head joint part. The securing arm respectively can be sectionally positioned adjacent to an inner cavity surface of the joint head support and an inner cavity surface of the joint head such that the support arm provides a second load path between the first and the second structural component in case of a mechanical defect that involves weakening of the joint head joint part.

According to an embodiment of the invention, the securing arm respectively is sectionally extending adjacent to an inner cavity surface of the joint head support such that the securing arm makes available a second load path between the first and the second structural component in case of a mechanical defect that involves a weakening or rupture of the joint head joint part and an accommodation of a section of the securing arm by the inner cavity surface of the joint head support.

According to an embodiment of the invention, the securing arm is sectionally extending adjacent to an inner cavity surface of the joint head support such that the securing arm makes available a second load path between the first and the second structural component in case of a mechanical defect that involves a weakening of the joint head joint part and an accommodation of a section of the securing arm by the inner cavity surface of the joint head support. In particular, the cavity is formed such that it enlarges behind the joint head support when seen from the securing arm endpiece.

In the present invention, one essentially distinguishes between two operating modes of the connecting device. The first mode is the "normal mode," in which the joint head joint part is intact with respect to its supporting and load transmitting functions. The other mode is the "defect mode," in which a mechanical defect has occurred that involves weakening of the joint head joint part. Such a defect may consist, for example, of a fracture of the joint head joint part or of a material weakening caused by temperature effects or mechanical influences such as stoning. Due to the mechanical defect in the joint head joint part, the load transmission for supporting the load in the joint head joint part is impeded or even interrupted. Such a defect therefore would lead to the failure of the connecting device which, in the worst-case scenario, would correspond to the two connected structural components breaking up.

Due to the inventive connecting device, the aforementioned disadvantages of the state of the art are eliminated and, in particular, a failure safety with respect to the connecting function in the defect mode is realized. A bearing connection consisting of a receiver and a joint head joint part makes it possible to achieve the load transmission for supporting the loads on the one hand and the rotatability with three degrees of freedom on the other hand. This simple and, in particular, compact design is combined with the advantage that the securing arm provides a second load path that only transmits part of the load in case of a defect in the joint head joint part. In this case, the securing arm is not subjected to a load in the normal mode, but rather situated in the interior of the joint head joint part in a load-free fashion. Such a second, securing load path is also referred to as a dormant load path. In this context, it needs to be noted that no load is respectively transmitted between the securing arm and the inner cavity surface of the joint head support and the inner cavity surface of the joint head that are sectionally situated adjacent thereto in the normal mode, but rather only in the defect mode. It furthermore needs to be noted that deformations of the joint head joint part in the elastic range may also occur in the normal mode without activating the second load path. In other words, the securing arm also remains load-free during such elastic deformations of the joint head joint part. The advantage of this embodiment can be seen in that the securing arm is not subjected to any loads in the normal mode and therefore also not subjected to any wear caused by loads. Consequently, the securing arm is, in a manner of speaking, essentially unused at the time it is needed, i.e., in case of a defect.

The scope of the present invention also includes embodiments, in which the securing arm transmits a load in the normal mode. However, the securing arm does not serve as the primary load path in this normal mode, but rather merely contributes to the load transmission. In case of a defect, such a second effective load path transmits the entire load. The advantage of such an embodiment can be seen in that practically no relative movement between the joint head joint part and the securing arm needs to take place in case of a defect in order to activate the second load path. A brief interruption of the load transmission and an ensuing shock during the absorption of the load by the second load path do not occur in such an embodiment.

The inventive mode of operation can be achieved, for example, in that a certain clearance respectively exists between the securing arm and the inner cavity surface of the joint head support and the inner cavity surface of the joint head that are sectionally situated adjacent thereto in the normal mode, wherein this clearance prevents a load transmission between these parts in this normal mode, as well as during elastic deformations of the joint head joint part.

If a defect occurs in the joint head joint part, the load transmission in the first load path is impeded or even interrupted. In this case, the lacking load transmission causes the joint head joint part to begin moving in such a way that it exceeds the radius of action of the joint head joint part in the normal mode. During this movement, the securing arm, in particular, at least partially adjoins the inner cavity surface of the joint head support and the inner cavity surface of the joint head that are sectionally situated adjacent thereto such that they can support one another. In this way, the second load path is activated and the mechanical defect is, in a manner of speaking, bypassed.

According to one exemplary embodiment of the present invention, the joint head joint part is composed of several parts, namely of the joint head support and the joint head accommodated thereby. Among other things, this multipart design provides the advantage that more complex shapes of the joint head joint part can also be assembled of simpler individual parts. In this way, the manufacturing costs for the individual parts, as well as for the entire joint head joint part, are reduced. This also makes it possible, in particular, to decouple the shaping of the joint head from the shaping of the mounting on the second structural component. In addition to the superior geometric adaptability, this decoupling also makes it possible to use different materials for the individual parts of the joint head joint part. Such material differences may be adapted to different manufacturing techniques or optimally withstand the different influences during the operation of the connecting device. It would be conceivable, for example, to utilize high-quality and/or coated joint heads that are optimized with respect to the movement within the receiver while the joint head support is made of a material with superior torsional rigidity. In this way, the exchange of wearing parts such as, for example, the joint head is also simplified because it is no longer necessary to exchange the entire joint head joint part.

The joint head joint part may alternatively also be manufactured in one piece. The one-piece design is particularly advantageous with respect to the fatigue strength of the joint head joint part because connections of any type frequently form weak points. A one-piece design of the joint head joint part consequently provides the advantage of reducing the required connections between individual components of the connecting device to a minimum. This also automatically reduces the susceptibility to defects of the entire connecting device.

It may be advantageous to sectionally provide a clearance between the outside contour of the securing arm and the inside contours of the inner cavity surface of the joint head support and an inner cavity surface of the joint head such that the securing arm is not subjected to a load when the joint head joint part is mechanically intact. As already mentioned above, this embodiment of the present invention concerns the design with a dormant second load path that is only activated for the load transmission in case of a defect. This means that the loads, to which the second load path and, in particular, the securing arm are subjected in the normal mode, are reduced to a minimum such that the functionality of the securing arm is preserved over a long period of time.

Since practically no wear of the securing arm takes place due to mechanical loads in such a construction, a securing arm of this type can be used much longer and also remain in the connecting device after the exchange of wearing parts such as, for example, the joint head.

According to another exemplary embodiment of the present invention, the respective clearance between the securing arm and an inner cavity surface of the joint head support and an inner cavity surface of the joint head amounts to no more than 5% of the maximum diameter of the joint head joint part. With respect to the creation of the second load path in case of a defect, a clearance between 0.5% and 5% of the maximum diameter of the joint head joint part may be particularly advantageous for the functionality of the securing arm. The reference of the clearance to the maximum diameter is advantageous because connecting devices with different dimensions can be designed in this way. In this case, the maximum diameter of the hollow joint head provides a correlation to the elastic deformations of the joint head joint part to be expected in the normal mode. In relatively small connecting devices, a relatively small clearance between the securing arm and an inner cavity surface of the joint head support and an inner cavity surface of the joint head accordingly suffices while a correspondingly larger clearance may be advantageous for a relatively large joint head.

It may be advantageous if the joint head of an inventive connecting device is realized spherically and at least partially accommodated in the receiver in a form-fitting fashion. In this case, the spherical design is not only ideal with respect to the desired rotative degrees of freedom, but also with respect to the load transmission. The ball with a receiver that accordingly is at least partially realized in the form of a hollow sphere is able to carry out tilting movements in all directions, as well as rotational movements about the main axis referred to the opening of the receiver. The corresponding spherical surfaces of the joint head and the receiver also provide an optimal load transmission. The load to be transmitted is evenly distributed over these spherical surfaces such that load peaks that could lead to undesirable plastic deformations within the receiver or the joint head are prevented. In this context, it should be noted that the terms "spherical" and "form-fitting" naturally not only refer to the geometrically ideal shapes, but also to shapes with tolerances that can be realized with the respective production technology.

Another option for dimensioning the clearance between the securing arm and an inner cavity surface of the joint head support and an inner cavity surface of the joint head consists of this clearance amounting to no more than 20% of the minimum material thickness at the respective inner cavity surface. In this case, the clearance lies, in particular, between 1 and 20% of the minimum material thickness at the respective inner cavity surface. The material thickness at the respective inner cavity surface also provides a correlation to the elastic deformations to be expected and to be tolerated in the normal mode. In this context, it needs to be observed that the clearance between the securing arm and an inner cavity surface of the joint head support and an inner cavity surface of the joint head does not have to be constant along the components, but may also vary. This variation may be dependent on or also independent of the correlation to the material thickness.

In order to secure the largest possible portion of the joint head joint part, it may be advantageous if the securing arm extends through the joint head joint part. The securing arm, in a manner of speaking, penetrates the joint head joint part, particularly the joint head. In this way, it is possible to realize the maximal securing of the joint head joint part. The opening may be realized, for example, relatively small in the form of a round bore, wherein the inner bore surface in the form of an inner cavity surface of the joint head may form a supporting surface of the joint head joint part. In this case, a supporting surface would be adjacently positioned on the outer side of the securing arm that extends through this bore. The two supporting surfaces consist of generated surfaces of a cylinder that can be supported on one another in case of a defect.

In order to also quantitatively adapt the freedom of motion of the two structural components in all three rotative degrees of freedom to complex relative movements, it may be advantageous if the pivoting range with respect to the rotatory degrees of freedom is as large as 60°. A pivoting range of up to 60° allows a multitude of complex movements, particularly with respect to a combination of the individual rotative degrees of freedom. However, it would also be conceivable to realize smaller pivoting ranges depending on the intended use of the connecting device. In the connection of structural components of an airframe, for example, it may be sensible if the pivoting range is as large as 20°. In order to ensure a certain safety with respect to the freedom of motion, it may furthermore be sensible to additionally provide another 8° pivoting range in each rotational degree of freedom so as to prevent an overrotation and possibly associated damages to the receiver and/or the joint head joint part.

It may furthermore be advantageous to provide a receiver safety for being mounted on the first structural component, wherein said receiver safety prevents the joint head from being removed from the receiver in case of a mechanical defect that involves weakening in the receiver. Such a receiver safety therefore forms a failure safety for the area of the receiver analogous to the failure safety for the area of the joint head joint part formed by the securing arm. Mechanical defects that involve a weakening in the receiver may be created, for example, by abrasion over the service life and, for example, jamming of the joint head. Material defects in the receiver or shocks transmitted from the joint head to the receiver also may lead to plastic deformations, cracks or even fractures in the receiver. In case of such a defect, the receiver may still be able to transmit compressive forces and shearing forces due to its accommodation in the first structural component, but the transmission of tensile forces may no longer be ensured. Consequently, the receiver safety prevents the joint head from being pulled out of the receiver and therefore a separation of the connection between the two structural components.

In order to further improve the simplicity of the present invention, it may be advantageous to at least partially mount the securing arm and the joint head joint part on the second structural component with the same mounting means. Such mounting means could consist, for example, of threaded bolts that are used for screwing the connecting device to the second structural component. In this case, such bolts may extend through a part of the joint head endpiece that is shaped similar to a flange and interact with corresponding bores in the second structural component. At least some of the bolts may also serve for mounting the securing arm such that the securing arm and the joint head joint part are mounted on the second structural component by means of the same bolts. However, it would also be conceivable to use mounting means in the form of separate bolts that exclusively serve for mounting the securing arm on the second structural component. In this way, the securing arm may also be decoupled from the first load path with respect to its connection to the second structural component. This decoupling serves for additionally improving the safety because impairments that leads to a mechanical defect involving a weakening in the joint head joint part also are not transmitted to the mounting means of the securing arm. This connection therefore also forms part of the failure safety realized with the securing arm.

It may also be advantageous if the joint head and/or the receiver feature/features a coating for improving the relative sliding movements at least in the contact regions of the two parts. Such a coating serves for reducing the coefficient of sliding friction between the two parts. This reduction on the one hand makes it possible to reduce the forces required for the relative movement between the two structural components by at least the frictional forces to be overcome. On the other hand, a coating of this type minimizes the risk of a "bearing seizure," in which both the joint head and the receiver are plastically deformed and the relative moveability of the connecting device is lost.

In order to ensure that the safety path also has a sufficient surface with respect to the loads to be transmitted, it may be advantageous if the sections, in which the securing arm respectively is situated adjacent to an inner cavity surface of the joint head support and an inner cavity surface of the joint head, amount to at least 25% of the inside contour of the joint head joint part. In other words, at least 25% of the inside contour of the joint head joint part are secured by the securing arm in this way and serve as supporting surfaces in case of a defect. The loads can be transmitted along the second load path via these surfaces.

Another object of the present invention is a flap system of an aircraft that features at least a structural component of an airframe component and at least a structural component of a flap component. The structural component of an airframe component can be the first component and structural component of a flap component can be the second component, and vice versa. The two structural components are at least partially connected to one another by means of one or more connecting devices according to the present invention. Particularly in the connection of regulating flaps to the main wing of an aircraft, the flap system requires, according to aerodynamic aspects, a complex movement in order to ideally position the regulating flap relative to the main wing. This ideal positioning is based on the direction, in which the relative wind acts upon the main wing, and not on the orientation in the wingspread direction.

A complex movement of the regulating flap relative to the main wing therefore is required for the ideal positioning. An inventive connecting device makes it possible to attach the regulating flap to the main wing in a compact fashion without preventing the complex movement due to this attachment.

Consequently, only the utilization of the inventive connecting device makes it possible to realize a compact design despite ideal aerodynamic positioning.

In an inventive flap system, it may be advantageous if the connecting device is provided between an actuator arranged on an airframe component and a regulating flap. In this case, the connection to an actuator is particularly important because relatively large relative movements between the actuator and the regulating flap take place at this location when the complex relative movement is carried out. In the connection to an actuator, the available structural space is also limited because the actuator is a moving apart, the movements of which require a corresponding clearance zone. The utilization of an inventive connecting device therefore makes it possible to realize a compact connection despite the failure safety and the complex movement.

Another object of the present invention is an aircraft that features an inventive flap system. The failure safety of components is of decisive importance, particularly in aircraft, such that the combination of the fail-safe design of the connecting device and the three rotational degrees of freedom is a decisive advantage.

BRIEF DESCRIPTION OF THE DRAWINGS

The invention is described in greater detail with reference to the attached drawings. In this context, the terms "left," "right," "top," and "bottom" refer to an orientation of the drawings with normally readable reference symbols. In these drawings.

DETAILED DESCRIPTION

Figure 1:
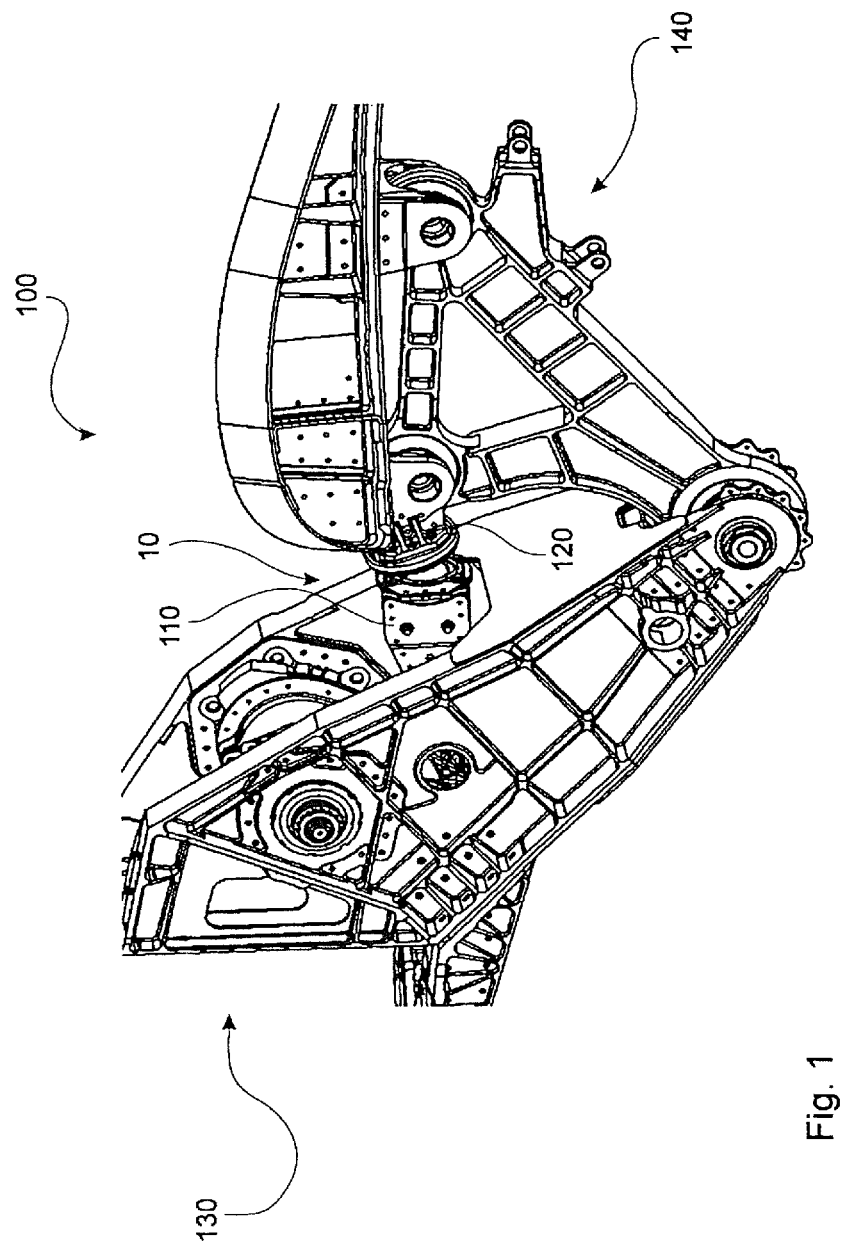
FIG. 1 shows an exemplary embodiment of a connecting device in a flap system of an aircraft.

FIG. 1 shows a first exemplary embodiment of a connecting device 10 that connects two structural components 110 and 120 of a flap system 100 to one another. The first structural component 110 consists of an actuator in the form of a lever, wherein said lever forms part of a lever linkage that in turn is connected to the airframe 130 and able to move the second structural component 120 relative to the first structural component 110. The second structural component 120 consists of a regulating flap of a flap component 140 that can be arranged in different positions relative to the first structural component 110 depending on the flight situation. In this exemplary embodiment, the relative positioning is realized with the actuator, i.e., with the first structural component 110. However, it would also be possible to realize exemplary embodiments, in which the first structural component is not a relatively movable part, but rather merely represents a bearing point for the relative movement of the second structural component 120.

In addition to an essentially triangular lever that serves as first support of the flap component 140, this flap component is connected to the first structural component 110 by means of a second structural component 120 and a connecting device 10. Since the positioning of the second structural component 120 relative to the first structural component 110 takes place in a complex fashion, i.e., is realized with more than one rotational degree of freedom, a connecting device 10 is provided that serves as a bearing for the load transmission between the two structural components 110 and 120 despite this complex movement. The connecting device 10 in the exemplary embodiment illustrated in FIG. 1 is essentially realized in the form of a ball-and-socket joint that is designed in a fail-safe fashion with respect to mechanical defects. For example, a connecting device 10 of the type described in greater detail below, particularly with reference to FIGS. 5 to 9, is used in this exemplary embodiment.

Figure 2:
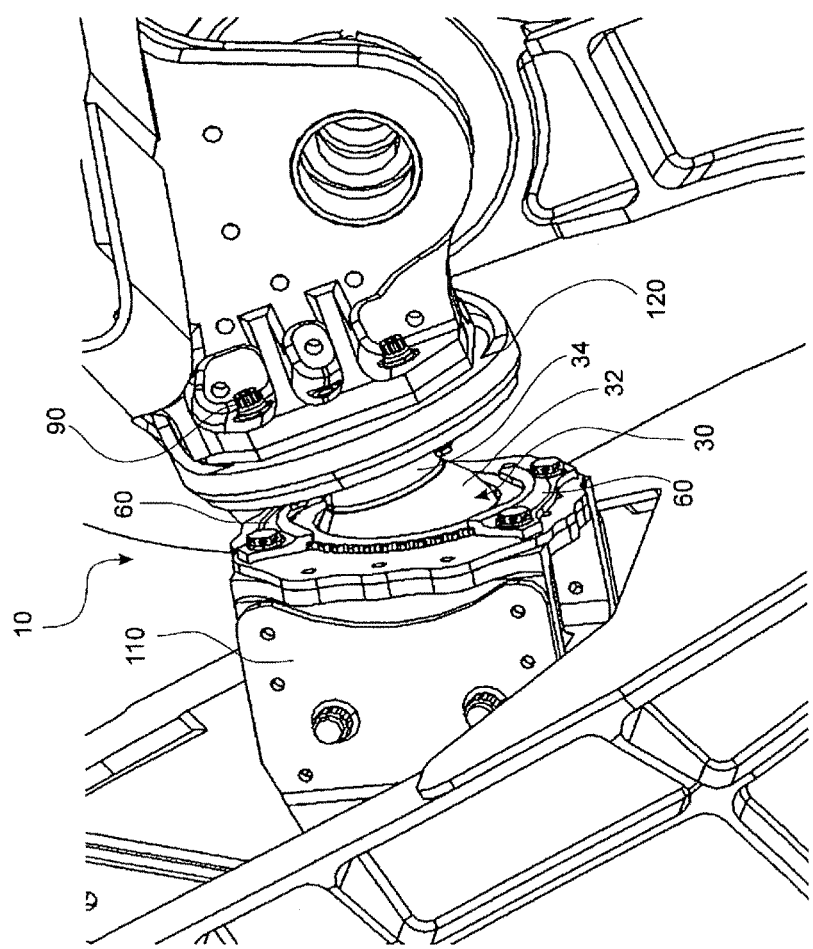
FIG. 2 shows a detail of the connecting device according to the exemplary embodiment illustrated in FIG. 1.

FIG. 2 shows a detail of the exemplary embodiment according to FIG. 1. The region of the connecting device 10 is illustrated in an enlarged fashion in this detail. The first structural component 110 that forms part of a lever actuator for moving the second structural component 120 is shown on the left side of this illustration. The second structural component 120 forms part of a flap system 140 and is situated on the right side in FIG. 2. The connecting device 10 is arranged in between. This connecting device features a joint head joint part 30 that is at least partially illustrated between the two structural components 110 and 120 in FIG. 2. This joint head joint part 30 is provided with three regions, wherein the joint head 20 according to FIG. 2 partially protrudes from a receiver 20 accommodated in the first structural component 110, and wherein a joint head support 34 is also illustrated in this figure.

The mounting between the second structural component 120 and the joint head joint part 30 is ensured with mounting means 90 in the form of several bolts. The joint head joint part 30 therefore is connected to the second structural component 120 in a motionally rigid fashion while the receiver 20 is connected to the structural component 110 in a motionally rigid fashion due to its accommodation therein. In this exemplary embodiment, the relative movement between both structural components 110 and 120 takes place in the form of a relative movement between the receiver 20 and the joint head joint part 30.

FIG. 2 furthermore shows a receiver safety that serves as failure safety in case mechanical defects occur that involve a weakening of the receiver 20. The concrete function of this receiver safety is described in greater detail further below. This receiver safety 60 is also mounted on the first structural component 110 with mounting means in the form of bolts. In order to simplify the installation, the receiver safety 60 consists of two parts such that it can also be installed or even exchanged after the installation of the connecting device is completed.

Figure 3:
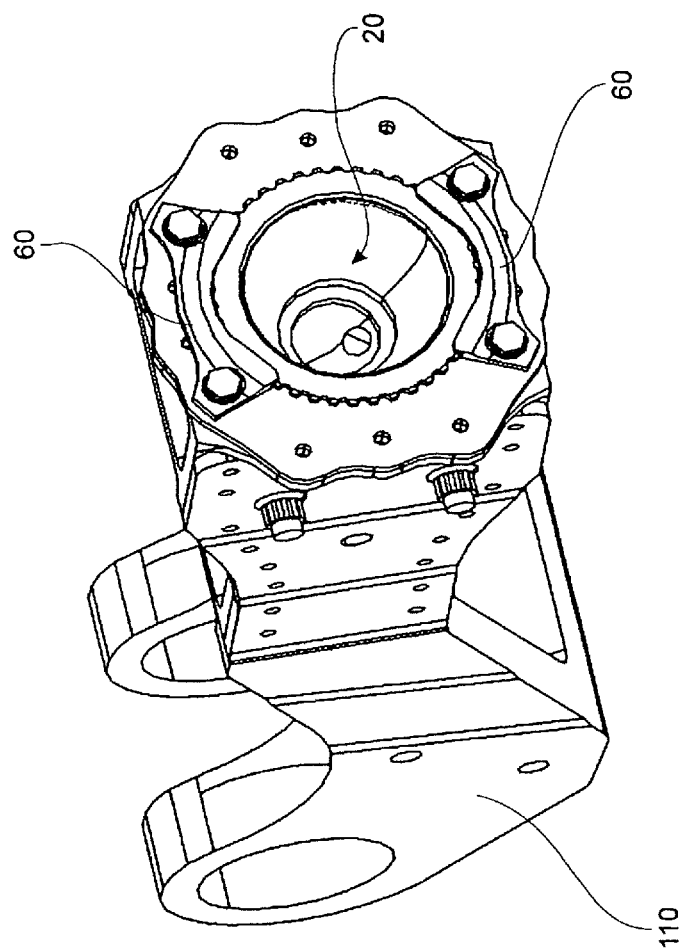
FIG. 3 shows an individual illustration of the first structural component according to the exemplary embodiment illustrated in FIG. 1.

FIG. 3 shows a dismounted first structural component 110 in the form of an actuator. This first structural component already features a receiver 20 or bearing shell that is accommodated therein and ready to accommodate a joint head joint part 30. In this case, the receiver is essentially realized in the form of a hollow sphere and designed for cooperating with a joint head 32 of a joint head joint part 30. The joint head 32 essentially has the shape of a ball, i.e. a major part of the outer surface of the joint head 32 forms a ball. The receiver safeties 60 are already installed in the illustration according to FIG. 3. These two receiver safeties 60 need to be removed for the installation of the joint head joint part 30 and can be reattached after the joint head 32 has been installed.

Figure 4:
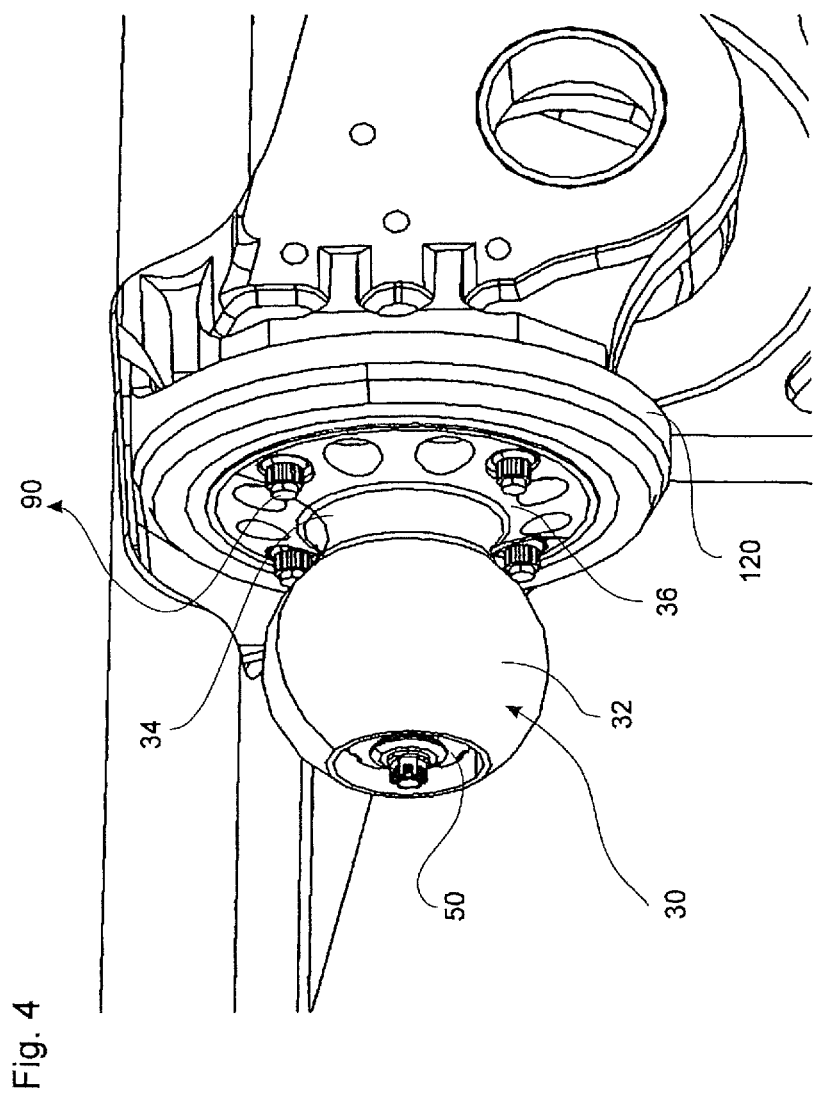
FIG. 4 shows a detail of a dismounted joint head joint part according to the exemplary embodiment illustrated in FIG. 1.

FIG. 4 shows the counterpart of the first structural component 110 according to FIG. 3. The dismounted joint head joint part 30 is illustrated in FIG. 4. This joint head joint part 30 is connected to the second structural component 120. This connection is produced with mounting means 90 in the form of bolts. The joint head joint part 30 is equipped with three functional regions. One of these regions is a joint head 32 that has an essentially spherical shape and therefore is suitable for being accommodated in and cooperating with the receiver 20 according to FIG. 3. The joint head joint part 30 furthermore features a joint head support that bridges the distance between the joint head 32 and the second structural component 20. In addition, a joint head endpiece 36 is provided and mounted on the second structural component 120. In this case, the joint head endpiece is essentially realized in the form of a flange such that the joint head endpiece 36 and therefore also the entire joint head joint part 30 is mounted on the structural component 120 with mounting means 90 in the form of bolts. The four mounting means 90 illustrated in this figure should be interpreted as an example only. Depending on the operating situation and the safety requirements, it is also possible to use a much larger number of bolts as mounting means 90. In FIG. 4, 12 bores suitable for accommodating bolts are already machined into the joint head endpiece 36 in the form of a flange.

The spherical shape of the joint head 32 is interrupted on the outermost end (in FIG. 7 the left end) of the joint head joint part 30 that is positioned farthest within the receiver 20 after the installation in this receiver 20. The end of a securing arm 50 is visible through the thusly created opening or a through hole in the joint head. This region of the opening is not intended for the load transmission between the two structural components 110 and 120 and therefore also not intended for the load transmission between the receiver 20 and the joint head joint part 30. The load rather is exclusively transmitted from the spherical surface of the joint head 32 to the hollow spherical surface of the receiver 20. The opening in the joint head 32 serves for the installation of the securing arm 50, particularly for mounting the securing arm 50 with the aid of a screw.

Figure 7:
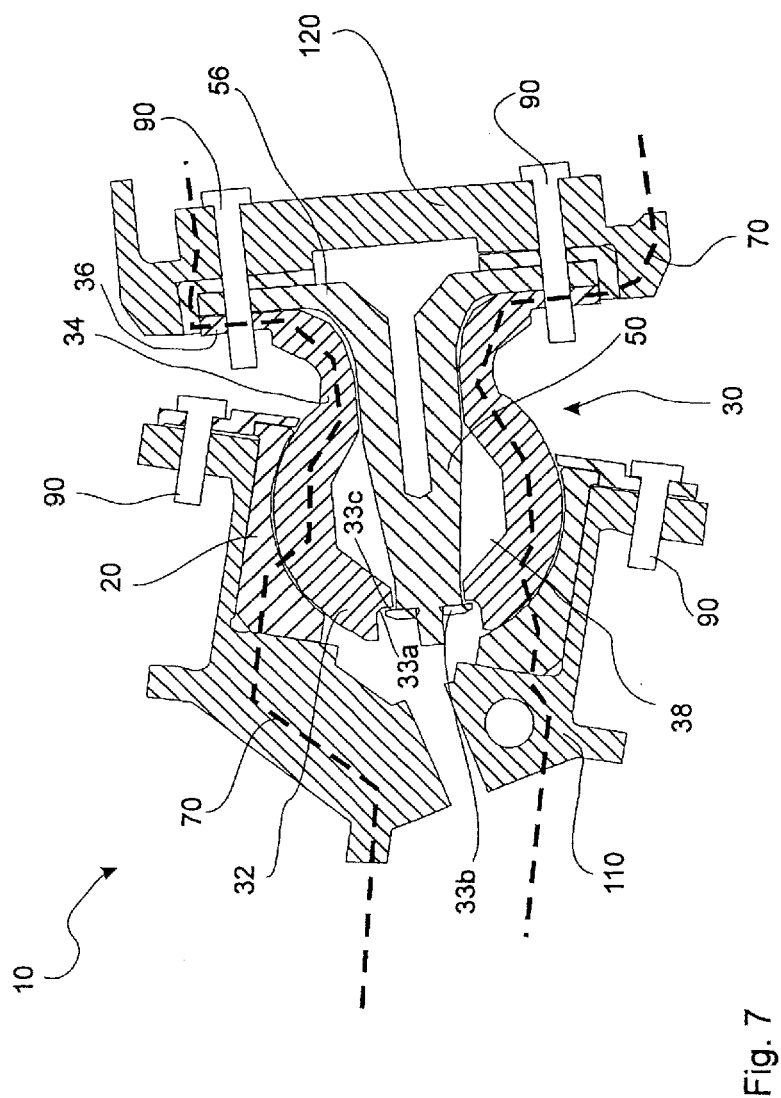
FIG. 7 shows the exemplary embodiment according to FIG. 6 in the normal mode, wherein the first load path is also illustrated in this figure.
Figure 8:
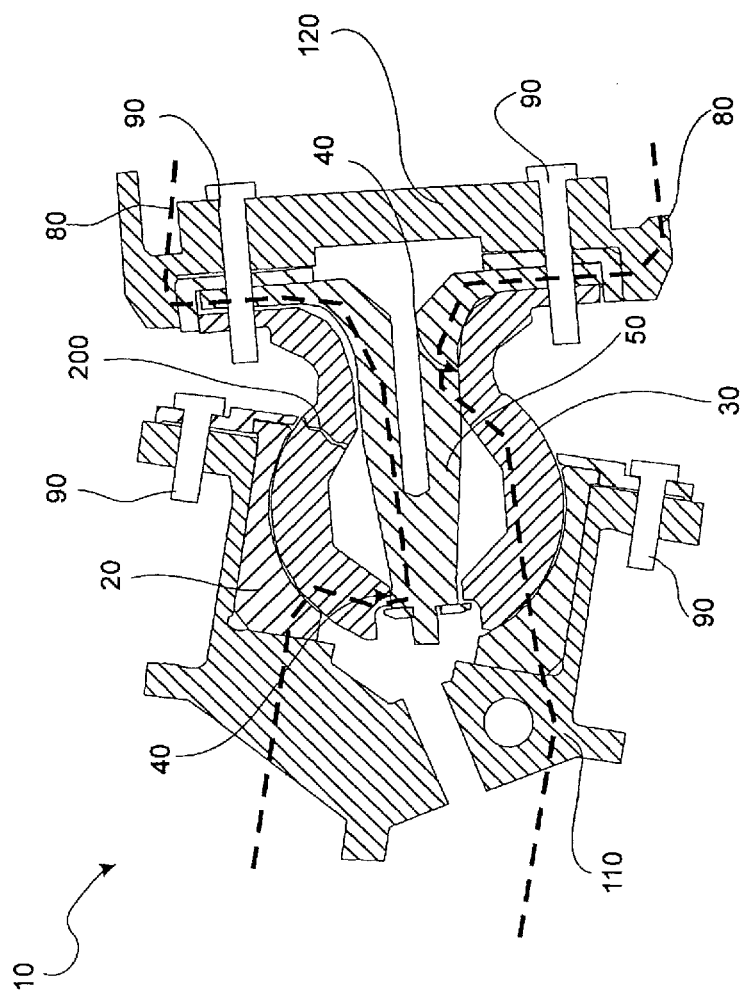
FIG. 8 shows the exemplary embodiment according to FIG. 6 in case of a defect, wherein the second load path is also illustrated in this figure.

According to an embodiment of the invention, the outermost part of the securing arm 50, which is located opposite to the securing arm endpiece 56, extends over a flange 33*a* which is formed in the through hole and extends in circumferential direction around the through hole. A first face or abutment face of the flange 33*a* is directed away from the securing arm endpiece 56. As can be seen in FIG. 7, the securing arm 50 comprises an abutment piece 33*b* which can be a separate part like a retainer which can be connected to the securing arm 50 for example at the end of the same. Alternatively, the abutment piece 33*b* and the securing arm 50 are formed or manufactured as one piece. The abutment piece 33*b* extends in radial direction over the circumferential surface of the securing arm 50 which extends from the abutment piece 33*b* in direction to the securing arm endpiece 56. In this section of the abutment piece 33*b* extending radially over the surface of the securing arm 50, a second face or abutment face 33*c* is formed which is directed to the securing arm endpiece 56 and is facing the first face of the flange 33*a*. Preferably, in the normal operation of the connecting device, the first and the second face are positioned such that there is a predetermined clearance between the first and the second face. Further, there can be clearance between the outer circumferential section of the surface of the securing arm 50 lying opposed to the respective inner surface of the through hole. In the case of a defect that involves a predetermined weakening or a predetermined rupture of the joint head joint part 30, the first and the second face are transferring a load path, as can be seen in FIG. 8. In the embodiment in which a clearance is between the surfaces of the securing arm 50 and the inner surface of the through hole which are facing each other, by such a predetermined weakening or a predetermined rupture of the joint head joint part 30 (FIG. 8) the first and the second face are getting in an abutment to each other.

Figure 5:
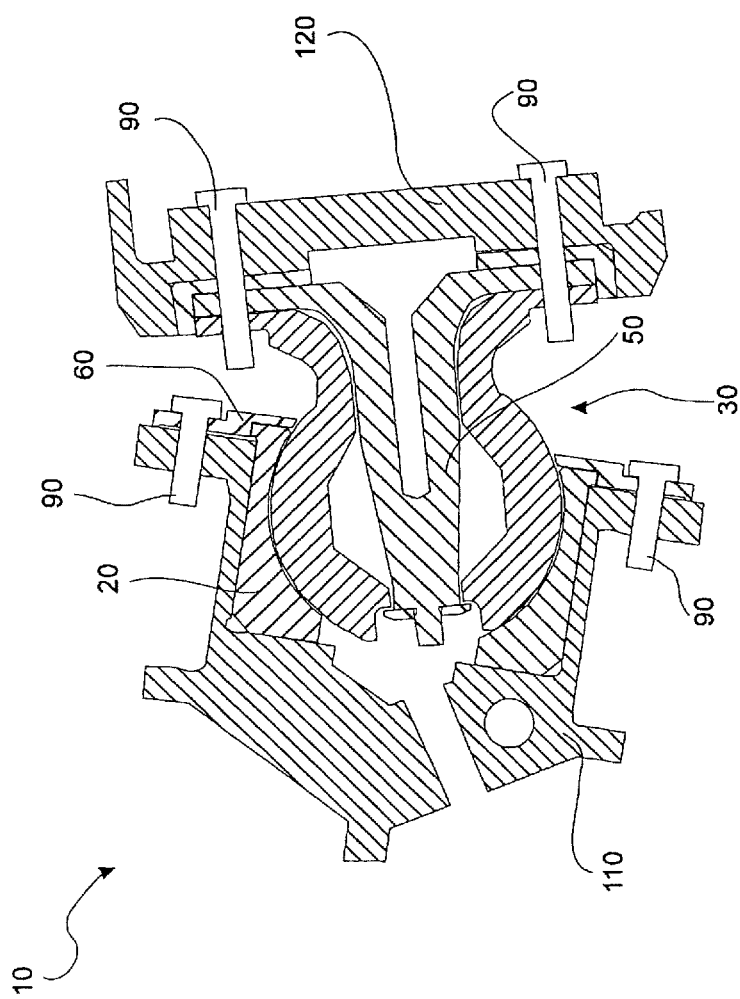
FIG. 5 shows an exemplary embodiment of a connecting device in the form of a cross section.
Figure 6:
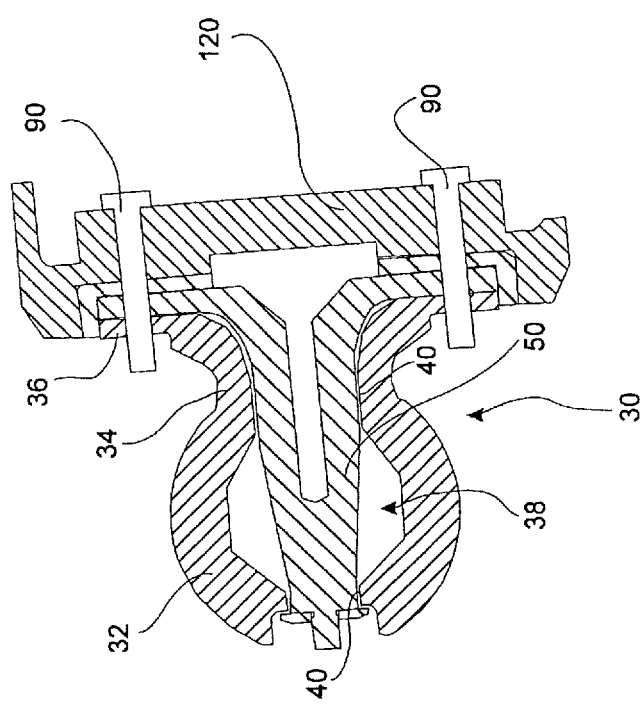
FIG. 6 shows the joint head joint part according to the exemplary embodiment illustrated in FIG. 5 in the form of a cross section.

FIGS. 5 and 6 show cross sections of an exemplary embodiment of a connecting device 10. This exemplary embodiment represents one optional design suitable for use in a flap system according to FIGS. 1 to 4. According to the exemplary embodiment illustrated in FIG. 5, the connecting device 10 features a receiver 20 and a joint head joint part 30 as central elements. The receiver 20 is accommodated in the first structural component 110 and practically recessed therein in its entirety. The receiver is furthermore secured from sliding out of the receptacle in the first structural component 110 by means of the receiver safety 60. This receiver safety 60 is in turn mounted on the first structural component 110 with mounting means 90 in the form of bolts. In this way, the position of the receiver 20 relative to the first structural component 110 is defined.

The joint head joint part 31 once again features three functional regions and is manufactured in one piece. The three regions consist of the joint head 32 itself, the joint head support 34 and the joint head endpiece as they are identified in FIG. 6. The joint head joint part 30 is mounted on the second structural component 120 by means of the joint head endpiece 36 and with mounting means 90 in the form of bolts.

The concrete design of the securing arm 50 is elucidated further below with reference to the cross section illustrated in FIG. 6. In this figure, the joint head joint part 30 is removed from the receiver 20. The securing arm 50 protrudes into the interior of the cavity 38 of the joint head joint part 30. This cavity extends through the joint head joint part 30, particularly through joint head 32 and the joint head support 34. In this case, the securing arm 50 is realized in a slightly conical fashion such that it can be easily inserted into the cavity 38 of the joint head joint part 30 during the installation. In addition, the securing arm 50 respectively is sectionally positioned adjacent to an inner cavity surface 40 of the joint head support 34 and an inner cavity surface 40 of the joint head 32. A clearance that can also be referred to as play exists between the securing arm 50 and the respective inner cavity surface 40. This clearance is so large that the securing arm 50 does not come in contact with the inner cavity surfaces 40, namely not even during elastic deformations of the joint head joint part 30. Due to its geometric extent into the cavity 38 of the joint head joint part 30 and the above-described clearance, the securing arm 50 forms a dormant second load path that does not transmit a load in the normal mode.

The securing arm 50 is positioned between the joint head endpiece 36 and the second structural component 120 and mounted on this second structural component 120 analogous to the joint head joint part 30 with the same mounting means in the form of bolts. A compensating ring that exactly positions the joint head joint part 30 relative to the second structural component is arranged between the securing arm 50 and the second structural component 120.

FIGS. 7 and 8 show the two operating situations with respect to possible mechanical defects that involve a weakening in the joint head joint part 30. FIG. 7 shows the normal mode, i.e., the operating situation without a mechanical defect. In this normal mode, the load is transmitted from the first structural component 120 to the second structural component 110 along a first load path 70. In this context, it should be noted that the load is by no means transmitted along a line only, but that this first load path 70 merely represents the basic path of a three-dimensional load transmission from the first structural component 120 to the first structural component 110.

The first load path 70 extends from the second structural component 120 into the joint head joint part 30 and from there into the first structural component 110 via the receiver 20. In this case, the first load path 70 refers to compressive forces, as well as to tensile forces and shearing forces. Consequently, the entire intact joint head joint part 30 forms part of the first load path.

In the event of damages, a mechanical defect that involves a weakening in the joint head joint part 30 may occur, for example, as illustrated in FIG. 8. This figure shows a fracture of the joint head joint part 30 in the region of the transition from the joint head support 34 to the joint head 32. This fracture interrupts the first load path 70 illustrated in FIG. 7. Due to the interrupted first load path 70, the load can at least no longer be diverted from the second structural component 120 such that it unintentionally moves relative to the first structural component 110. In this case, no movement or hardly any movement of the joint head joint part 30, particularly of the joint head 32, relative to the receiver takes place. However, a relative movement takes place between the joint head joint part 30 and the securing arm 50.

The result of the relative movement between the joint head joint part 30 and the securing arm 50 is illustrated in FIG. 8. This relative movement stops as soon as the securing arm 50 comes in contact with the inner cavity surfaces 40 of the joint head 32 and of the joint head support 34. This means that the securing arm 50 is supported on these inner cavity surfaces 40. This support creates a second load path 80 that is also schematically illustrated in the form of two lines in FIG. 8. However, the second load path 80 also represents a three-dimensional load transmission, wherein the load is now transmitted from the second structural component 120 to the securing arm 50 and from there into the receiver and therefore into the first structural component 110 via part of the joint head. The second load path 80, in a manner of speaking, bypasses the mechanical defect 200.

Figure 9:
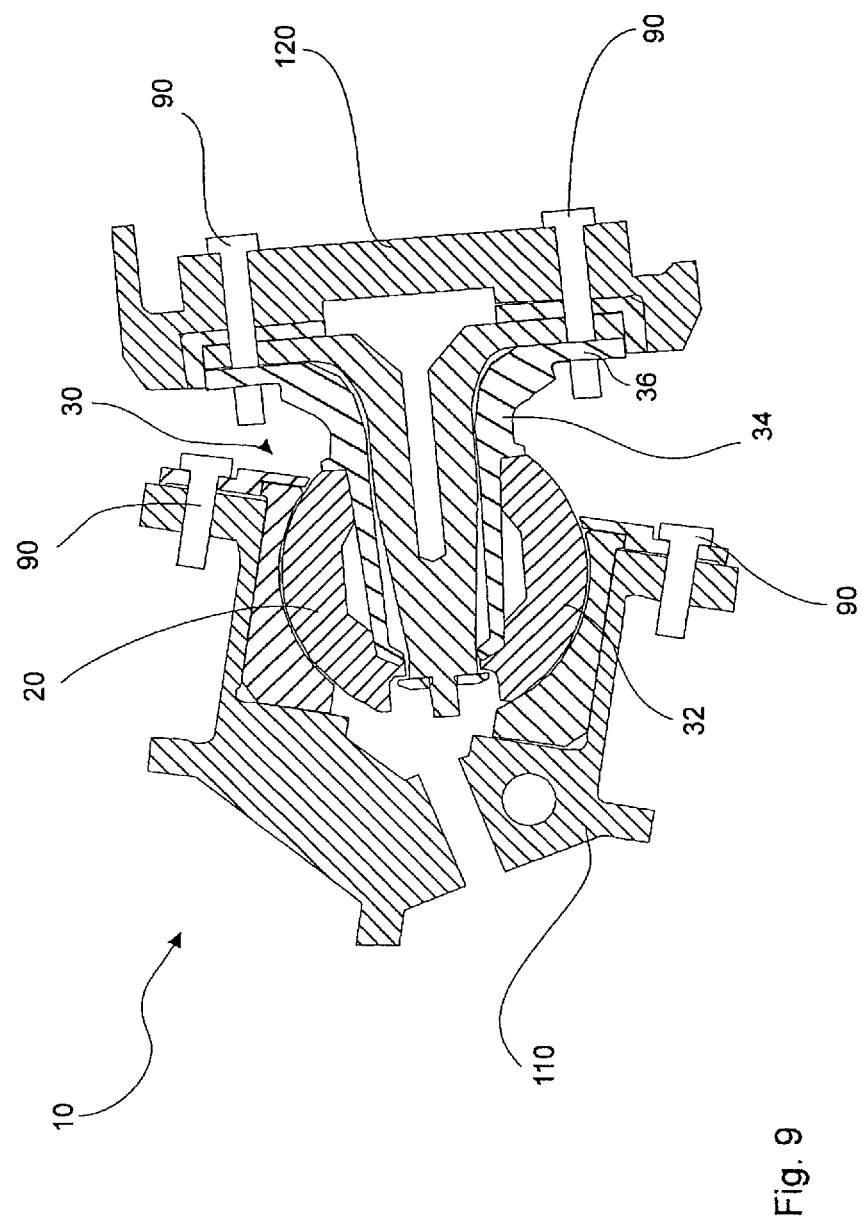
FIG. 9 shows another exemplary embodiment of a connecting device with separate joint head support.

FIG. 9 shows another exemplary embodiment of a connecting device 10. The connecting device 10 illustrated in this figure is realized very similar to the exemplary embodiment according to FIGS. 5 to 7, but the joint head joint part 30 has a multipart design in this exemplary embodiment. In this case, the multipart design refers to a separation of the functional regions of the joint head joint part 30. The joint head 32 is manufactured separately of the joint head support and rigidly connected thereto. The joint head endpiece 36 is realized integrally with the joint head support in this exemplary embodiment. This made it possible to create a shape that allows a much simpler and, in particular, more cost-effective manufacture of the joint head joint part 30. If a mechanical defect occurs in the joint head joint part 30, it furthermore is merely required to exchange the corresponding defective component, i.e., either the joint head 32 or the joint head support 34. This also makes it possible to reduce the costs for maintenance and repair procedures. In the exemplary embodiment according to FIG. 9, the functionality of the securing arm 50 is identical to that described in detail above with reference to the exemplary embodiment illustrated in FIGS. 5 to 8.

REFERENCE SYMBOLS

10 Connecting device
20 Receiver
30 Joint head joint part

32 Joint head
33a flange
33b abutment face
33c first surface
34 Joint head support
36 Joint part endpiece or joint head endpiece
38 Cavity
40 Inner cavity surface
50 Securing arm
56 Securing arm endpiece
60 Receiver safety
70 First load path
80 Second load path
90 Mounting means
100 Flap system of an aircraft
110 First structural component
120 Second structural component
130 Airframe component
140 Flap component
200 Mechanical defect

The invention claimed is:

1. A flap system of an aircraft, comprising:
at least a structural component of an airframe component;
at least a structural component of a flap component; and
one or more connecting device,
wherein the two structural components are at least partially connected to one another by the one or more connecting device,
wherein the structural component of an airframe component is the first structural component and the structural component of a flap component is the second structural component, or wherein the structural component of an airframe component is the second structural component and the structural component of a flap component is the first structural component,
wherein the one or more connecting device connects the first structural component and the second structural component that is movable relative to the first structural component in an articulated fashion such that three rotational degrees of freedom are provided, the connecting device comprising:
a joint head joint part with a joint head for being accommodated by a receiver of the first structural component and a joint head support with a joint part endpiece for being secured to the second structural component to thereby mount the joint head joint part on the second structural component such that a first load path between the first and the second structural components is formed due to the accommodation of the joint head in the receiver, with the joint head joint part comprising a cavity with an inner cavity surface, wherein the cavity extends through the joint head and the joint head support,
a securing arm with a securing arm endpiece for being secured to the second structural component to thereby mount the securing arm on the second structural component, with the securing arm extending into the cavity of the joint head joint part,
wherein the securing arm respectively is sectionally extending along an inner cavity surface of the joint head support such that the securing arm makes available a second load path between the first and the second structural component in case of a mechanical defect that involves a weakening or rupture of the joint head joint part and an accommodation of a section of the securing arm by the inner cavity surface of the joint head support.

2. The flap system according to claim 1, wherein the joint head joint part has a multipart design and is composed of the joint head support and the joint head accommodated thereby.

3. The flap system according to claim 1, wherein the joint head joint part is manufactured in one piece.

4. The flap system according to claim 1, wherein the securing arm respectively is sectionally extending adjacent to an inner cavity surface of the joint head support such that the securing arm makes available a second load path between the first and the second structural component in case of a mechanical defect that involves a weakening or rupture of the joint head joint part and an accommodation of a section of the securing arm by the inner cavity surface of the joint head support.

5. The flap system according to claim 1, wherein the cavity that extends through the joint head and the joint head support enlarges behind the joint head support towards the joint head.

6. The flap system according to claim 1, wherein a clearance is sectionally provided between an outside contour of the securing arm and inside contours of the inner cavity surface of the joint head support and an inner cavity surface of the joint head such that the securing arm is not subjected to a load when the joint head joint part is mechanically intact.

7. The flap system according to claim 1, wherein a clearance between the securing arm and an inner cavity surface of the joint head support and an inner cavity surface of the joint head amounts to no more than 5% of a maximum diameter of the joint head joint part.

8. The flap system according to claim 1, wherein a clearance between the securing arm and an inner cavity surface of the joint head support and an inner cavity surface of the joint head amounts to no more than 20% of a minimum material thickness at the respective inner cavity surface.

9. The flap system according to claim 1, wherein a pivoting range with respect to the rotational degrees of freedom is as large as 60°.

10. The flap system according to claim 1, wherein a receiver safety is provided for being mounted on the first structural component, wherein the receiver safety prevents the joint head from being removed from the receiver in case of a mechanical defect that involves a weakening in the receiver.

11. The flap system according to claim 1, wherein the securing arm and the joint head joint part are mountable to the second structural component by a same mount.

12. The flap system according to claim 1, wherein the joint head or the receiver comprises a coating for improving relative sliding movements at least in contact regions of the joint head and the receiver.

13. The flap system according to claim 1, wherein sections, in which the securing arm respectively is situated adjacent to an inner cavity surface of the joint head support and an inner cavity surface of the joint head, amount to at least 25% of the inside contour of the joint head joint part.

14. The flap system according to claim 1, wherein at least one connecting device is provided between an actuator arranged on the airframe component and a regulating flap.

15. An aircraft comprising the flap system of claim 1.

* * * * *